(12) United States Patent
Oates

(10) Patent No.: US 8,607,501 B2
(45) Date of Patent: Dec. 17, 2013

(54) WATERING DEVICE

(75) Inventor: James Edgar Oates, Hawthorn (AU)

(73) Assignee: Moisture Matic Pty Ltd, Hawthorn, Victoria (AU)

( * ) Notice: Subject to any disclaimer, the term of this patent is extended or adjusted under 35 U.S.C. 154(b) by 341 days.

(21) Appl. No.: 12/990,443

(22) PCT Filed: Apr. 22, 2009

(86) PCT No.: PCT/AU2009/000494
§ 371 (c)(1),
(2), (4) Date: Oct. 29, 2010

(87) PCT Pub. No.: WO2009/132380
PCT Pub. Date: Nov. 5, 2009

(65) Prior Publication Data
US 2011/0036007 A1  Feb. 17, 2011

(30) Foreign Application Priority Data
May 1, 2008  (AU) ................................. 2008902132

(51) Int. Cl.
*A01G 27/06*  (2006.01)
(52) U.S. Cl.
USPC .............................................................. 47/81
(58) Field of Classification Search
USPC ................................................. 47/48.5, 81
See application file for complete search history.

(56) References Cited

U.S. PATENT DOCUMENTS

| 2,747,332 | A | * | 5/1956 | Morehouse | 47/81 |
| 3,069,807 | A | * | 12/1962 | Wall | 47/81 |
| 4,115,951 | A | * | 9/1978 | Becker et al. | 47/81 |
| 4,782,627 | A | * | 11/1988 | Hauk | 47/81 |
| 5,329,729 | A | * | 7/1994 | Liang | 47/81 |
| 5,647,170 | A | * | 7/1997 | Holtkamp, Jr. | 47/81 |
| D408,232 | S | * | 4/1999 | Liu | D8/1 |
| 6,287,641 | B1 | | 9/2001 | Ostendorf et al. | |
| 2004/0025428 | A1 | * | 2/2004 | De Winter | 47/48.5 |
| 2004/0139650 | A1 | | 7/2004 | Haq | |
| 2010/0043283 | A1 | * | 2/2010 | Tonkin | 47/48.5 |
| 2011/0036007 | A1 | * | 2/2011 | Oates | 47/81 |

FOREIGN PATENT DOCUMENTS

| CN | 200983785 Y | | 12/2007 |
| GB | 2223388 A | * | 4/1990 |
| JP | 06105624 A | | 4/1994 |
| JP | 09037663 A | | 2/1997 |
| JP | 11299374 A | * | 11/1999 |
| JP | 2000060327 A | | 2/2000 |
| JP | 2004267019 A | | 9/2004 |

* cited by examiner

*Primary Examiner* — Frank T Palo
(74) *Attorney, Agent, or Firm* — Volpe and Koenig, P.C.

(57) ABSTRACT

A watering device is provided that includes a receptacle and a sponge wick. The receptacle includes a reservoir and a probe. The probe projects from the reservoir and is adapted to extend into potting mix in a plant pot. The probe is also adapted to hook on to the rim of the plant pot in order to support the device thereon. The wick is adapted to extend from the reservoir within or along the probe and into the potting mix in the plant pot. The wick includes non-woven Polyvinyl Alcohol fibers which are bound by a Polyvinyl Alcohol foam resin.

16 Claims, 8 Drawing Sheets

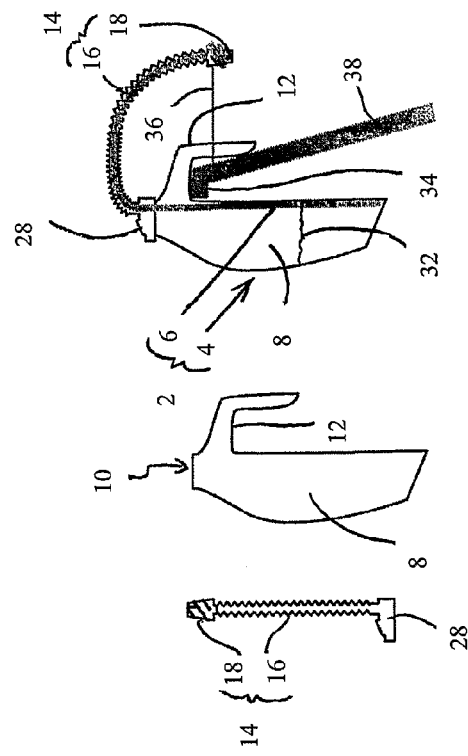
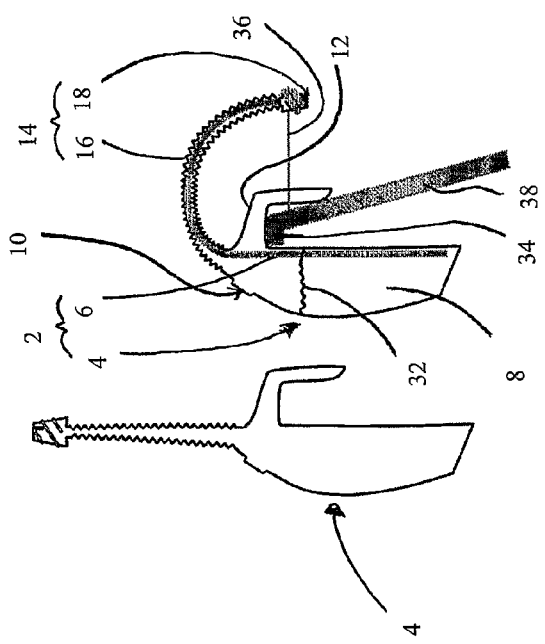
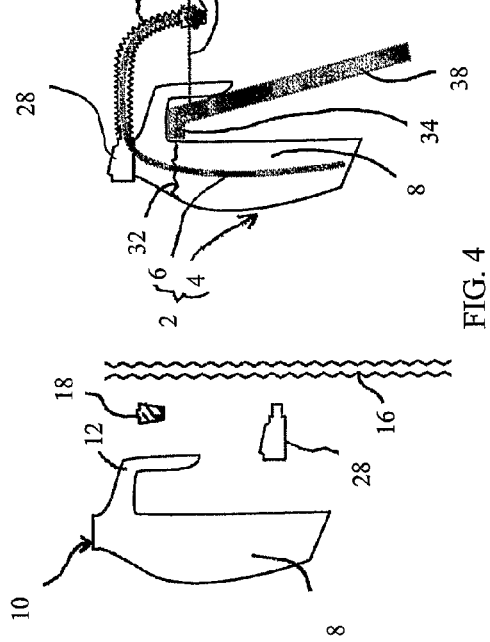
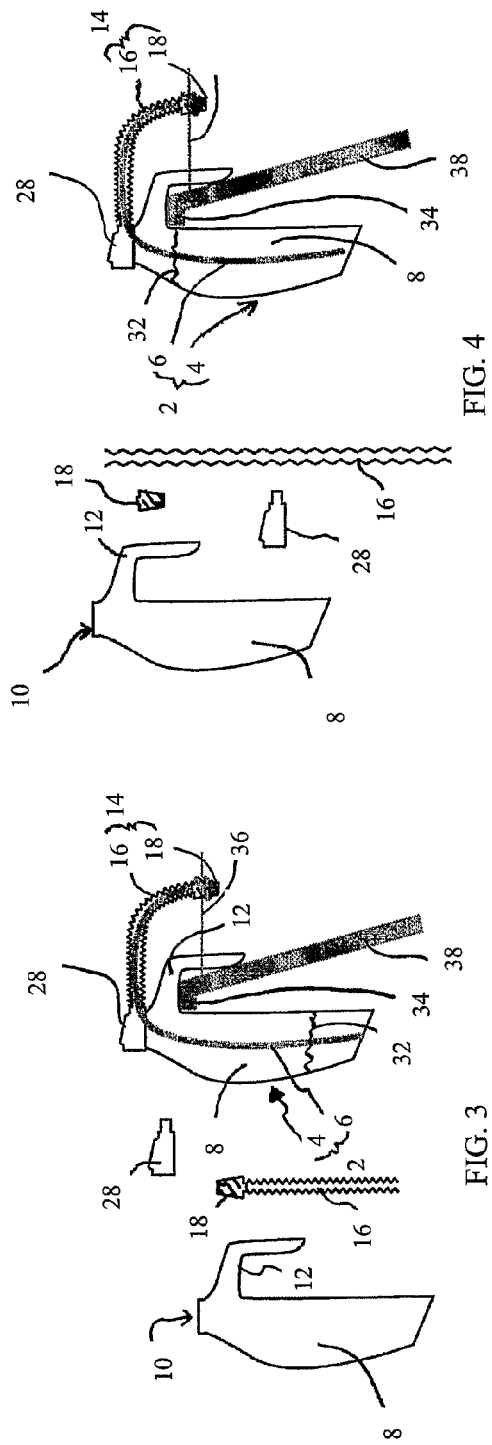
FIG. 1
FIG. 2
FIG. 3
FIG. 4

WATERING DEVICE

FIELD OF THE INVENTION

The present invention relates to a watering device. In a particular aspect, the invention relates to a device used for wick watering plants.

BACKGROUND

A water filled watering can with a handle and a spout is a device which is commonly used to water potted plants. However, there are inherent problems associated with its use. Some examples are described below:
  Pouring water on to the plant itself from above can be damaging to the plant;
  It is easy to pour too much water into the pot;
  It is easy to pour too little water into the pot;
  The plant may be watered too often;
  The plant may not be watered often enough, such as when the plant owner forgets or goes away on holidays; and
  Water poured onto the soil in the pot may not be absorbed effectively and may actually pass out through the bottom of the pot without being taken by all the soil leaving dry areas in the pot.

Whilst not being an admission of common general knowledge, wick watering is another method disclosed in the prior art. Wick watering may involve extending a wick between a dish filled with water and soil in a pot plant. The prior art wick may be made of cotton or microfibre. The watering takes place automatically by capillary action (wicking action) in which water from the dish is gradually drawn along the wick and into the soil. Although the prior art wicking method overcomes some of the problems associated with the watering can, it too has problems or disadvantages such as:
  Prior art wicks tend not to be very self regulating in that, 1) even after a suitable level of soil moisture has been reached they continue to release moisture into the soil too quickly which leads to overwatering of the plant, or 2) they do not release enough moisture into the soil thereby leaving the plant under watered;
  Eg. Cotton wicks tend to hold on to the water without conveying enough to the soil so that the plant is under watered; another drawback with cotton is that it tends to rot;
  Eg. Microfibre wicks convey water at a fast rate into the soil and tend to keep conveying water at a fast rate even after a suitable amount of moisture has been reached in the soil, thereby resulting in to overwatering of the plant;

SUMMARY OF THE INVENTION

In a first aspect, the invention provides a watering device comprising,
  a receptacle comprising a reservoir, and
  a wick adapted to extend from the reservoir into a plant growing medium,
wherein the wick is a sponge material comprising woven or non-woven fibres.

The fibres may comprise Polyvinyl Alcohol. Thus, the wick may comprise Polyvinyl Alcohol fibres.

The fibres may be non woven.

The fibres may be bound by a resin.

The resin may comprise a Polyvinyl Alcohol foam resin.

Thus, the wick may comprise Polyvinyl Alcohol fibres which are bound by a resin. The resin may comprise a Polyvinyl Alcohol resin. It may be mixed with other resins.

The Polyvinyl Alcohol fibres may be non woven.

In making the wick, the Polyvinyl Alcohol fibres may be carded, cross lapped and needle punched to produce a continuous web of non woven fibre. The resin may then be applied to the web. The resin may be a Polyvinyl Alcohol foam resin. The process may require low temperature curing.

The receptacle may comprise a probe adapted to penetrate or extend into the plant growing medium. The probe may project from the reservoir. The wick may be adapted to extend from the reservoir within or along the probe and into the plant growing medium.

In one form, the probe is hollow for passage of the wick therethrough. The probe may have a first aperture for allowing the wick to pass from within the probe to outside the probe. The probe may comprise an elongate tubular portion and a head. The head may be adapted to pierce the plant growing medium.

The first aperture may be present in the head, thereby allowing the wick to pass from within the head to outside the head. The wick may pass back outside the head towards the tubular portion. Suitably, the wick winds around the outer surface of the head. The head may have a spiral ridge for guiding the wick around the outer surface of the head. This arrangement may limit catching of the wick when the head is passed into the plant growing medium.

The head may have a second aperture for allowing the wick to pass from outside of the head to within the head. The wick may be tied off within the probe in order to prevent if from passing out through the second aperture.

A fixing or holding member may be present on the outside of the probe for fixing or holding one end of the wick. The fixing or holding member may be present on the outside of the head.

In another form the probe comprises,
  a stem projecting from the reservoir,
  a head located at a free end of the probe and adjoining the stem, the head being intended to be put or buried in the plant growing medium with the wick passing along the outer surface of the head, and
  a passage within the probe for the wick to pass through, the passage extending between the reservoir and the head.

The probe may comprise a dam. The dam may have a slot for locating the wick.

The probe may comprise an upper opening at or near the top of the head. The wick may pass from the reservoir through the passage within the probe, out of the probe through the upper opening, and down along the outside of the head.

The passage may extend within the head. The probe may comprise a lower opening at or near the bottom of the head. The wick may pass from the reservoir through the passage within the probe, out of the probe through the lower opening, and back up along the outside of the head.

The head may have a cone like shape whose sides converge towards the bottom of the head. Thus the head may converge to a bottom tip.

Exposure of the wick at the tip of the head may leave it more susceptible to damage. Thus the lower opening may be provided above the bottom tip of the head so that the wick can exit or enter through the lower opening above the tip and thereby avoid exposure of the wick at the tip.

The wick may define a slit. Thus the wick may split into two strips and then reunite to form a single strip.

The wick may split into two strips within the probe, following which the two strips may pass outside the probe and extend straight up or down along opposite sides of the outer surface of the head.

The head may define one or more grooves or channels along its outer surface for passage of the wick.

The water capacity of the reservoir is suitably greater than five percent of the volume of the plant growing medium in the pot being watered. Most suitably it will be at least ten percent.

The receptacle may comprise support means for supporting the device on a pot plant.

The support means may comprise a hook member which projects from the reservoir and is adapted to hook over the rim of the pot plant. The probe may double as the hook member.

The receptacle may comprise a fill port so that the reservoir may be filled with liquid. The fill port may comprise a mesh screen.

The receptacle may comprise a cap for the fill port.

The plant growing medium may comprise soil. More suitably, the plant growing medium comprises potting mix.

The watering device may be adapted for use with pot plants. The pot plants may be indoor or outdoor pot plants of any size. Typically, for pots having a diameter at their opening between 5 and 30 cm, the watering device is supported on the rim of the pot. For pots having a diameter at their opening greater than 30 cm, the watering device may be buried in the plant growing medium inside the pot. It may be buried entirely beneath the surface of the plant growing medium so that it is hidden from view.

The receptacle may be a one part blow moulding.

Alternatively the receptacle may be a two part configuration, wherein the first part is a blow moulding of the cap and the probe, and the second part is a blow moulding of the reservoir, support means, and fill port In another alternative, the receptacle may be a three part configuration, wherein the first part is an injection moulding of the cap, the second part is a blow moulding of the probe, and the third part is a blow moulding of the reservoir, support means, and fill port.

In yet another alternative, the receptacle may be a four part configuration, wherein the first part is an injection moulding of the cap, the second part is a blow moulding of the tubular portion of the probe, the third part is an injection moulding of the head of the probe, and the fourth part is a blow moulding of the reservoir, support means and fill port.

In a second aspect, the invention provides a wick for a watering device wherein,
  the wick is to be used with a receptacle which is in accordance with any one of the forms thereof described herein,
  the wick is adapted to extend from a reservoir of the receptacle into a plant growing medium, and
  the wick substantially comprises Polyvinyl Alcohol fibres.

In a third aspect, the invention provides the wick of the watering device in accordance with any one of the forms disclosed herein.

In a fourth aspect, the invention provides a receptacle for a watering device wherein,
  the receptacle is to be used with a wick which is in accordance with any one of the forms thereof described herein, and
  the receptacle comprises a reservoir adapted to receive the wick.

In a fifth aspect, the invention provides the receptacle of the watering device in accordance with any one of the forms disclosed herein.

BRIEF DESCRIPTION OF THE DRAWINGS

In order that the invention may be more fully understood there will now be described, by way of example only, preferred embodiments and other elements of the invention with reference to the accompanying drawings where:

FIG. 1 is a front elevational view of a one part wick watering device in accordance with a first embodiment of the invention;

FIG. 2 is a front elevational view of a two part wick watering device in accordance with a second embodiment of the invention;

FIG. 3 is a front elevational view of a three part wick watering device in accordance with a third embodiment of the invention;

FIG. 4 is a front elevational view of a four part wick watering device in accordance with a fourth embodiment of the invention;

DETAILED DESCRIPTION OF THE DRAWINGS

Figure 5:
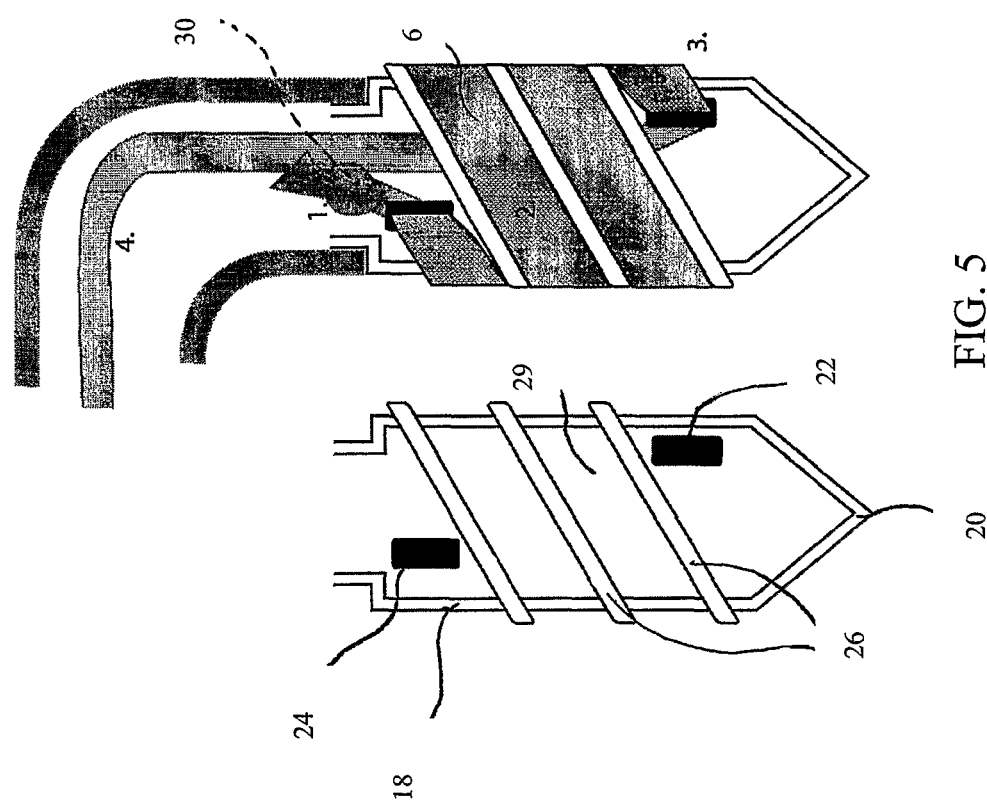
FIG. 5 is a magnified view of the head of the probe in FIG. 4 showing how the wick is assembled therewith.

The various elements identified by integers in the drawings are listed in the following integer list.

INTEGER LIST

2 Watering device
4 Receptacle
6 Wick
8 Reservoir
10 Fill port
12 Hook member
14 Probe
16 Elongate tubular portion
18 Head
20 Pointed tip
22 First aperture
24 Second aperture
26 Spiral ridge
28 Cap
29 Spiral groove
30 Knot
32 Water
34 Rim of pot
36 Potting mix
38 Pot
40 Watering device
42 Receptacle
44 Wick 46 Reservoir
48 Top portion
50 Bottom portion
52 Probe
54 Mouth
56 External thread
58 Aperture
60 Top fitting
62 Fill port
64 Mesh screen
66 Stem
68 Head
70 Passage
72 Upper opening
74 Lower opening
76 Tip
78 Dam
80 Slot
82 Channel
84 Strip
86 Central wall
88 Concave surface
92 Peripheral wall
94 First portion
96 Second portion Referring to FIGS. 1 to 4, there are shown four embodiments of a watering device 2. Equivalent features between the embodiments are referred to by the same integer in each of the Figures and the description below.

Each embodiment of the watering device 2 comprises a receptacle, generally designated 4, and a sponge wick 6.

The receptacle 4 comprises a reservoir 8, fill port 10, hook member 12, and a hollow probe 14. The fill port 10 opens into the reservoir 8. The hook member 12 projects from the reservoir 8. In the second to fourth embodiments the receptacle 4 further comprises a cap 28 for the fill port 10.

The probe 14 comprises an elongate tubular portion 16 and a head 18. The tubular portion 16 projects from and communicates with the reservoir 8 at one end and opens into the head 18 at the other end. The surface of the elongate tubular portion 16 has a "concertina" arrangement of folds to facilitate bending of the tubular portion to a desired configuration.

The receptacle 4 of the first embodiment shown in FIG. 1 is a one part blow moulding. In FIG. 2, the receptacle 4 of the second embodiment is a two part configuration in which the first part is a blow moulding of the cap 28 and the probe 14, and the second part is a blow moulding of the reservoir 8, hook member 12, and fill port 10. FIG. 3 shows the receptacle 4 of the third embodiment which is a three part configuration having a first part which is an injection moulding of the cap 28, a second part which is a blow moulding of the probe 14, and a third part which is a blow moulding of the reservoir 8, hook member 12, and fill port 10. Referring to FIG. 4, the receptacle 4 of the fourth embodiment is a four part configuration in which the first part is an injection moulding of the cap 28, the second part is a blow moulding of the tubular portion 16 of the probe 14, the third part is an injection moulding of the head 18 of the probe 14, and the fourth part is a blow moulding of the reservoir 8, hook member 12 and fill port 10.

FIG. 5 shows an enlarged view of the head 18 of the fourth embodiment having a pointed tip 20, a first aperture 22 proximate the tip 20, a second aperture 24 proximate the tubular portion 16, and a spiral ridge 26 running between the apertures 22, 24. A spiral groove 29 is formed between adjacent parallel portions of the ridge 26. The heads 18 of the first three embodiments have features which are equivalent to the fourth embodiment other than having a fixing or holding member on the outer surface of the head 18, or tubular portion 16 adjacent the head 18, instead of the second aperture 24.

Figure 6:
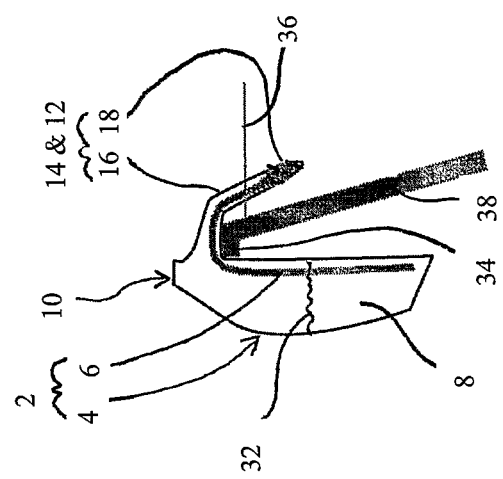
FIG. 6 is a front elevational view of a one part wick watering device in accordance with a fifth embodiment of the invention.

FIG. 6 shows a fifth embodiment of the invention which is a one part blow moulding. The fifth embodiment differs from the previously described embodiments in that the fifth embodiment has a single projection from the reservoir 8 which forms both the probe 14 and the hook member 12, whereas in the previously described embodiments the probe 14 and the hook member 12 are each formed by separate projections from the reservoir 8, The wick 6 is made of Polyvinyl Alcohol. In making the wick, Polyvinyl Alcohol fibres are carded, followed by cross lapping and then needle punching to produce a continuous web of non woven fibre. A Polyvinyl Alcohol foam resin is applied to bind the web of non woven fibre. Low temperature curing may occur and the web is cut into wick lengths. The hydrophilic Polyvinyl Alcohol fibres in the wick are non woven. The Polyvinyl Alcohol fibres are also non soluble.

The inventor has also found that the combination of the Polyvinyl Alcohol resin with the non woven Polyvinyl Alcohol fibres may produce a more suitable capillary action than a Polyvinyl Alcohol fibre wick without the resin.

A Polyvinyl Alcohol wick is used as it is able to self regulate the rate of water transmission from the water reservoir into potting mix 36 depending on the saturation of the potting mix 36. Thus, when the potting mix 36 is dry the rate of water transmission from the Polyvinyl Alcohol wick to the potting mix 36 is high so that the moisture in the potting mix 36 increases, whereas when the potting mix 36 becomes suitably wet for the plant the wicking rate slows down so that the plant is not overwatered.

The inventor has discovered that the self regulating ability of the unwoven Polyvinyl Alcohol wick is more effective than that of prior art wicks for watering pot plants. For instance, cotton wicks (which are not admitted as common general knowledge) of the prior art tend to absorb plenty of water but are not able to transmit enough of the water from the wick into the soil, so that the soil does not become wet enough and the plant is under watered. In another example, microfibre wicks (which are not admitted as common general knowledge) of the prior art are able to transmit water to the soil at a relatively high rate, but the rate of transference continues to be high even after the soil has reached suitable wetness, thereby leading to oversaturation of the soil and overwatering of the plant.

The wick 6 may be assembled with the receptacle 4 in the following steps:

In the first three embodiments, the outer end of the wick 6 is mechanically fixed or held adjacent the outer surface of the head 18 or tubular portion 16 towards the head 18;

In the fourth embodiment, the outer end of the wick 6 is tied in a knot within the head 18 and the wick is threaded out of the head 18 through the second aperture 24;

In each of the embodiments, the wick 6 is wound down around the outer surface of the head 18 in the spiral groove 29; and The wick 6 is threaded into the head through the first aperture 22, passed through the tubular portion 16 of the probe 14 and then further into the reservoir 8 so that the inner end of the wick 6 contacts the base of the reservoir.

The following steps may be taken in order to use the device 2 with a pot plant:

Remove the cap 28 (not present in the first embodiment) from the fill port 10;

Fill the reservoir 8 by pouring water 32 into the fill port 10. Fertiliser may be added if desired;

Place the hook member 12 over the rim 34 of the pot 38 so the reservoir 8 hangs outside the pot; and Push the head 18 of the probe 14 beneath the surface of the potting mix 36.

The design of the watering device whereby the wick winds back up around the head of the probe and the head is adapted to pierce beneath the surface of the potting mix facilitates delivery of moisture from the wick to beneath the surface of the potting mix, thereby limiting evaporation of the moisture. Furthermore having this design, whereby the exposed part of the wick wraps back up around the head, serves to limit catching of the exposed wick when the probe is being pushed into the potting mix.

The inventor has found that the device works particularly well for use with indoor potted plants with regular or premium potting mix measured to Australian standards. The type of plant growing medium used and the height of water 32 in the reservoir 8 do appear to affect the flow rate of water into the potting mix from the wick.

However, even though water tends to be transmitted faster from the Polyvinyl Alcohol wick into the potting mix with a fuller reservoir, if the potting mix is already suitably wet then the flow rate will still be reduced by self regulation to an extent that the plant is not overwatered.

The inventor has also discovered that potting mix tends to be a more suitable plant growing medium than soil which is used in the prior art for wick watering plants. The potting mix facilitates absorption of moisture and movement thereof throughout the pot 38, whereas more of a clay based soil tends to absorb moisture in a more local area. The inventor has found that for most plants in a standard pot 38, under normal household atmospheric conditions, the plant can be sufficiently watered for ten days or longer before a reservoir of approximately ten percent volume of the potting mix in the pot 38 needs to be refilled.

Figure 7:
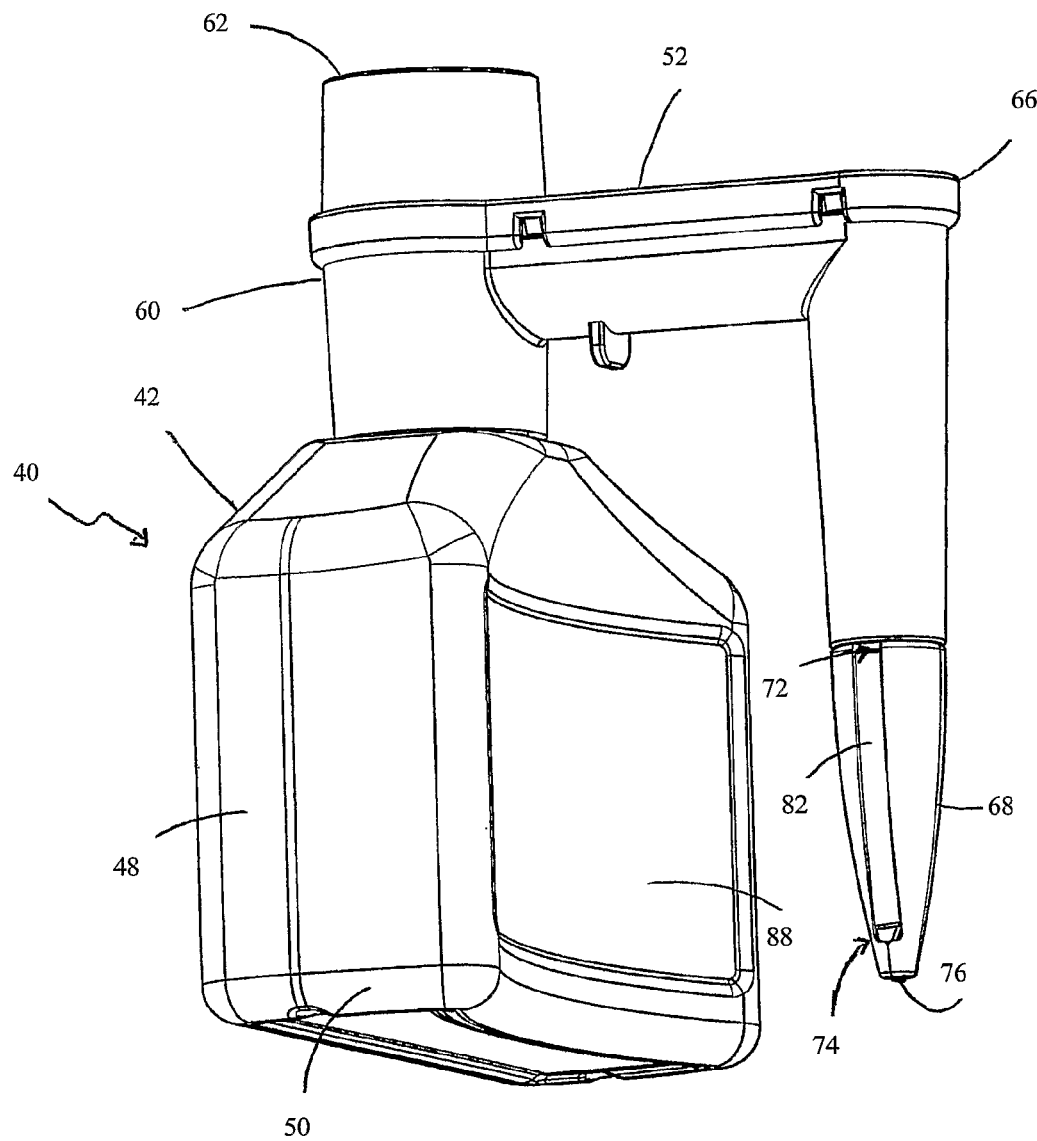
FIG. 7 is an isometric view of a 350 ml version of a watering device in accordance with the invention.
Figure 8:
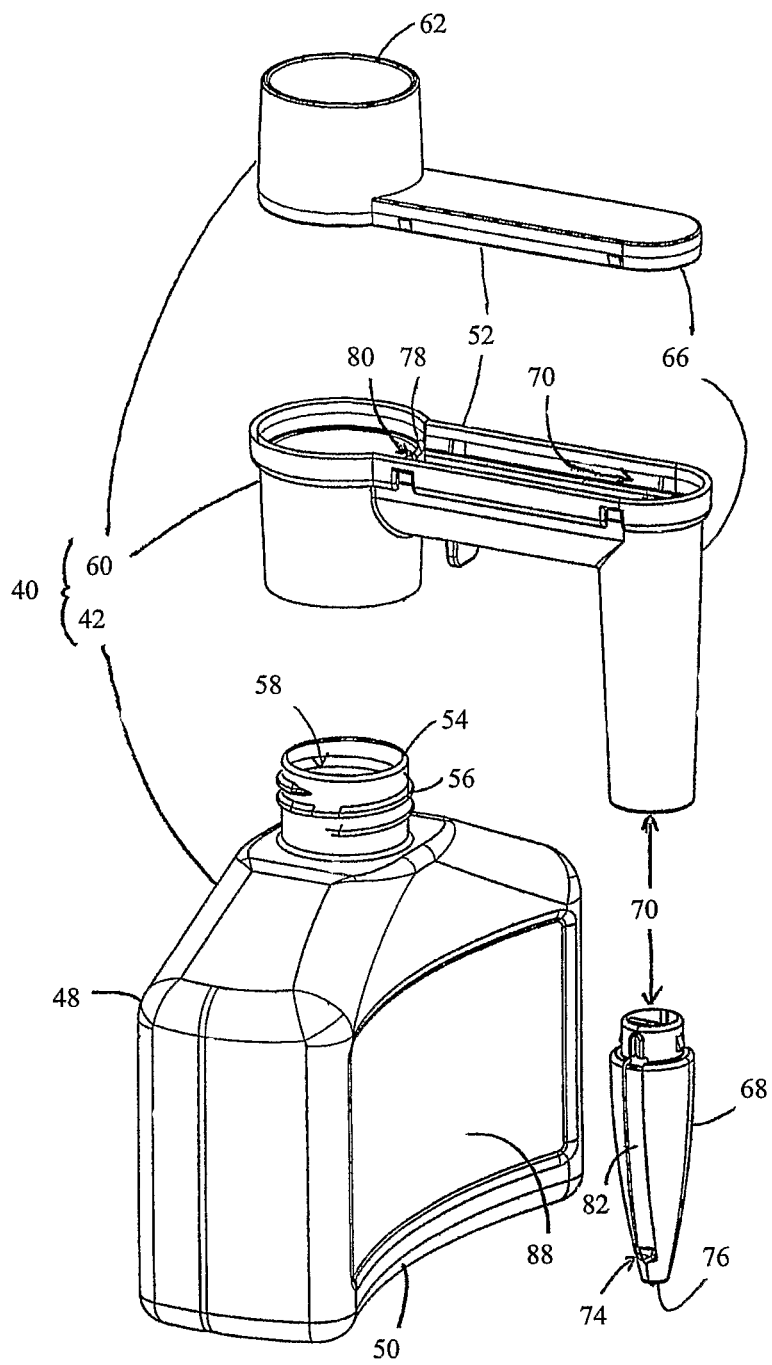
FIG. 8 is an exploded isometric view of the 350 ml version.
Figure 10:
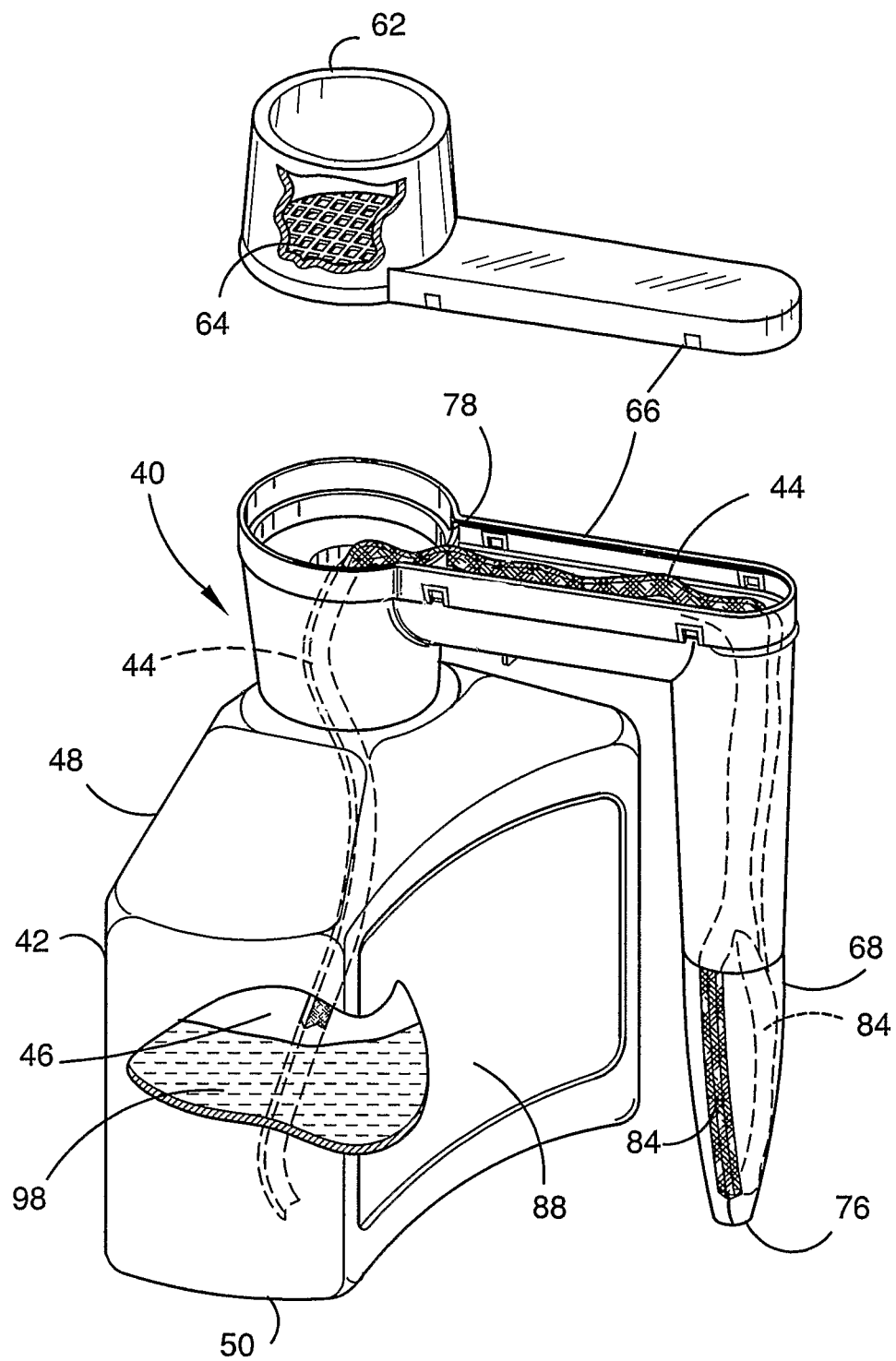
FIG. 10 is an isometric view of the 350 ml version which illustrates the path of the wick.

Referring now to FIGS. 7, 8 and 10 there is shown a further embodiment of a watering device, generally designated by reference numeral 40.

The watering device 40 comprises a plastic receptacle 42, and a Polyvinyl Alcohol sponge wick 44. The wick is an elongated strip. The receptacle comprises a reservoir 46 for water 98 and a top fitting 60.

The reservoir 46 in the embodiment 40 shown has a 350 ml capacity. Other reservoir sizes are also available, including one version with a 700 ml capacity (not shown) and another version with a 1000 ml capacity (not shown).

The 350 ml version is suitable for pots with a top opening diameter of 10 to 20 cm. The 700 ml version is suitable for pots with a top opening diameter of 20 to 30 cm. The 1000 ml version is suitable for pots with a top opening diameter of 30 to 40 cm.

Each of the 350 ml, 700 ml and 1000 ml reservoirs has a top portion 48 which is identical in size and shape, and a bottom portion or insert (reference no. 50 for the 350 ml version) which varies in size and shape between the three embodiments. Thus the top portion of each reservoir 46 is made from the one die whilst the bottom inserts are used to achieve the different reservoir 46 sizes.

The top portion 48 for the 350 ml, 700 ml and 1000 ml reservoir has a concave surface 88 which hugs against the convexity of a plant pot. The top portion 48 also has a cylindrical mouth 54 with an external thread 56. The mouth defines an aperture 58.

For the 350 ml version the bottom insert 50 is little more than a shallow base which is joined to the top portion. The bottom insert for the 700 ml version (not shown) has the same shaped base as the 350 ml version, but with a wall that extends vertically upward from the border of the base. Thus the 700 ml device looks like a height stretched version of the 350 ml device.

For the 350 ml, 700 ml and 1000 ml versions, 200 mm is the maximum height over which optimal wicking function is achieved with the Polyvinyl Alcohol wick. Therefore the height of the fillable part of the reservoir is preferably no greater than 200 mm. Thus, in creating the 1000 ml version (not shown), rather than further stretching the height of the fillable part of the reservoir, the capacity of the reservoir is increased by creating a rearward bulge in the bottom insert.

Although wetness of the potting mix is an important factor in wicking rate, applicant has also found in the 350 ml, 700 ml and 1000 ml versions that the flow rate can diminish to some extent as the water level in the reservoir drops. For these embodiments applicant has found that the ideal water level to avoid the saucer beneath the pot filling with water or the plant drying out is between 5 and 15 cm. Therefore, in order to increase the amount of time that the water in the reservoir is at an ideal level, the rearward bulge in the 1000 ml version spans between 5 and 15 cm above the base of the reservoir.

The top fitting 60 is identical in each of the 350 ml, 700 ml and 1000 ml versions. It screws on to the mouth of the reservoir 46. For transport the top fitting is folded in line with the reservoir. It is then rotated up to 90 degrees (depending on pot size and location of the plant) for attachment to the pot.

The top fitting 60 comprises a fill port 62 with a mesh screen 64 which opens into reservoir 46.

Further, the top fitting comprises a probe 52 having a stem 66 and a conical head 68. The stem 66 projects horizontally out from the reservoir and then vertically down before joining with the head 68 which ends in a bottom tip 76.

A passage 70 for the wick extends within the probe 52 from the reservoir (with which it communicates) to near the bottom tip 76 of the head.

The head 68 comprises a pair of upper openings 72 present on opposite sides near the top of the head. Each upper opening 68 opens into the passage 70.

Similarly, the head 68 comprises a pair of lower openings 74 which are present on opposite sides of the head just above the tip 76. Each lower opening 74 opens into the passage 70.

A pair of channels 82 extends vertically between upper and lower openings on the outside of opposite sides of the head 68. The channels 82 are for passage of the wick 44.

Figure 9:
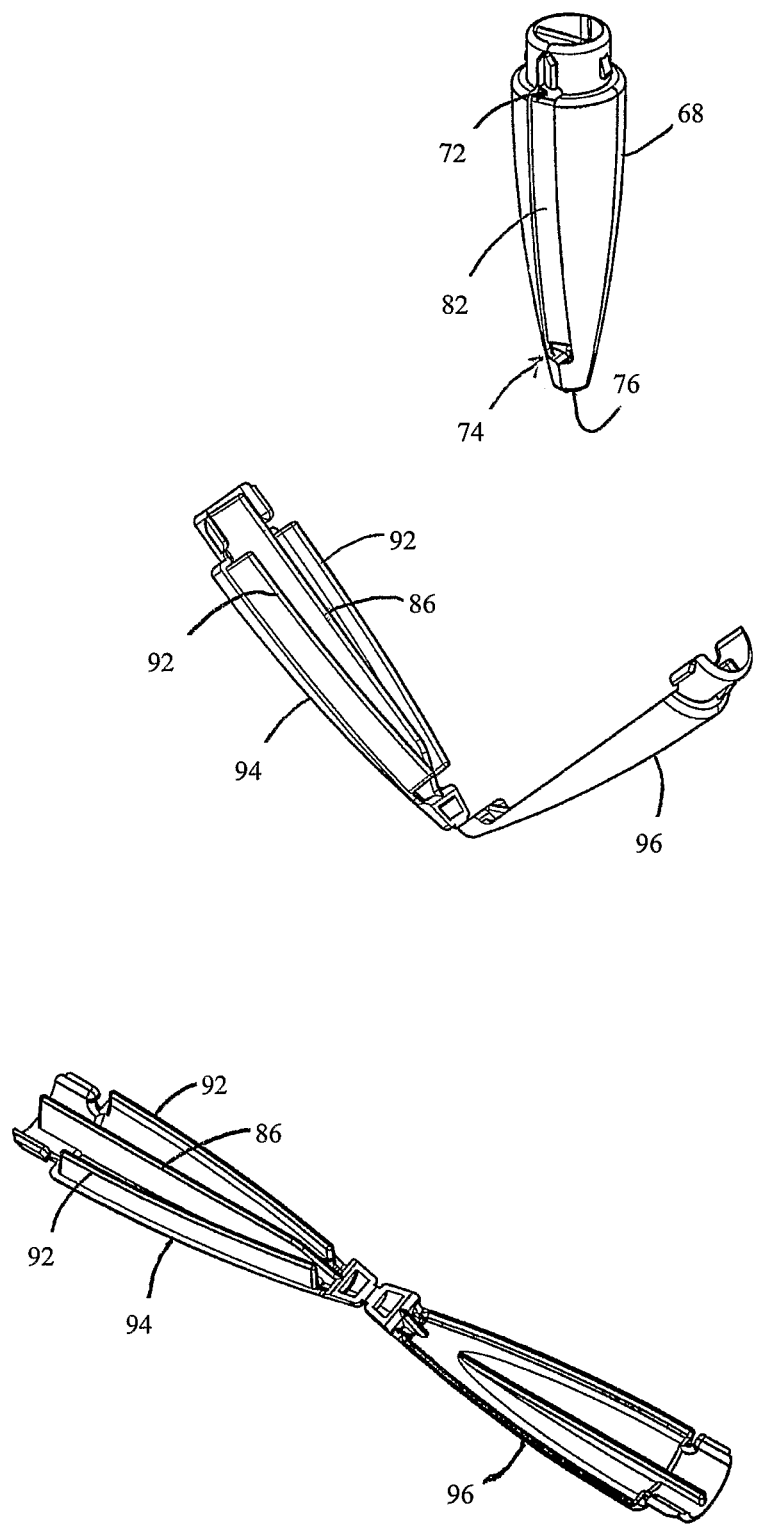
FIG. 9 shows the head of the probe in a closed view, a semi-open view, and an open view, the head being suitable for 350 ml, 700 ml, and 1000 ml versions of the watering device.

FIG. 9 shows the head as a separate piece which has been detached from the stem of the top fitting. As shown, the head has first and second portions, 94 and 96 respectively, which can be hinged open at the tip. The inside of the first portion has a pair of peripheral walls 92 which extend on opposite sides of the head and a vertical central wall 86 which extends between the peripheral walls 92 from the top of the head down towards the tip. When the head is closed the peripheral walls 92 form the bases of respective channels and the central wall 84 divides the passage 70 in two.

The stem 66 comprises a dam 78 (see FIGS. 8 and 10) which is designed to obstruct the flow of water from the reservoir 46 into the passage 70 and out on to the plant if the reservoir is overfilled.

The dam 78 defines a vertical slot 80 (see FIG. 8). As shown in FIG. 10, the slot provides a passage for the wick to pass from the reservoir 46 to the stem 66, as well as serving to locate the wick so that it is anchored in position for storage, transport and use. The long edges of the wick are in vertical alignment as they pass through the slot thereby ensuring that the bottom long edge of the wick is maintained at a consistent low height as it passes through the slot for optimal wicking efficiency.

In each of the 350 ml, 700 ml and 1000 ml versions of the watering device 40, the wick 44 extends from the bottom of the reservoir 46, up through the reservoir, up through the aperture 58 in the mouth 54, through the slot 80 into the passage, and along the passage in the stem towards the head, whereabouts it splits into two even strips 84 within the passage just above the central wall 86.

Figure 11:
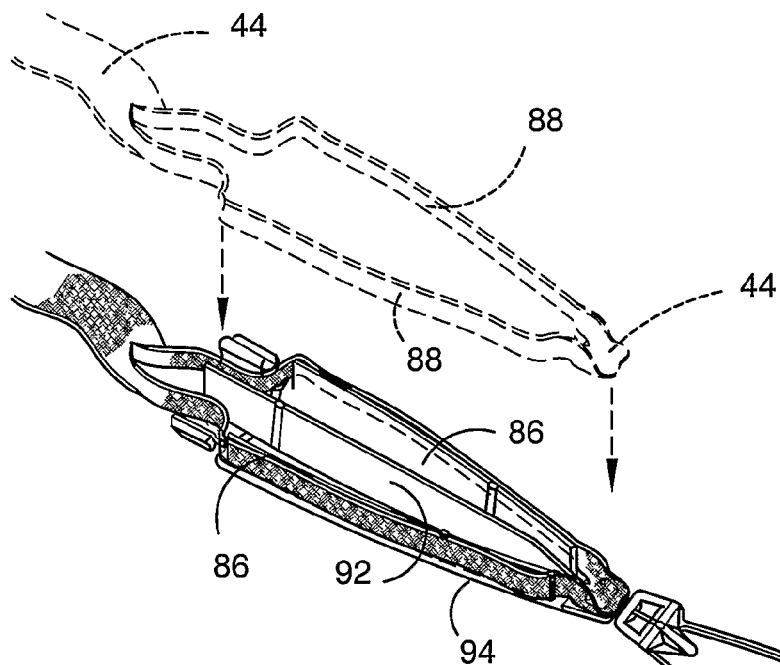
FIG. 11 shows the arrangement of the wick with respect to the head in the 350 ml version of the watering device.

As illustrated in FIGS. 10 and 11, in the 350 ml version of the watering device 40, the respective strips 84 off the wick pass briefly down on opposite sides of the central wall 86 before exiting the head through respective upper openings 72. Once outside the head, the strips pass down along the outside of the head 68 in channels 82. The strips then reenter the head through respective lower openings 74 where they reunite in the passage so as to once again form a unitary wick 44 near the tip 78 of the head.

Figure 12:
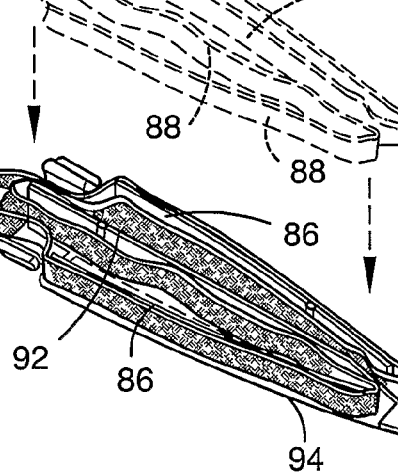
FIG. 12 shows the arrangement of the wick with respect to the head in the 700 ml and 1000 ml versions of the watering device.

As illustrated in FIG. 12, in the 700 ml and 1000 ml versions the respective strips 84 pass down opposite sides of the central wall towards the tip 76 before exiting the head through respective lower openings 74. Once outside the head, the strips pass up along the outside of the head in channels 82. The strips then reenter the head through respective upper openings 72 and reunite in the passage to again form a unitary wick just above the top of the central wall 86.

The above wick arrangements help to ensure that the wick will remain in position, as well as being simple and fool proof for enabling quick assembly.

By passing the wick back up along the outside of the head from near the tip (as in the 700 ml & 1000 ml versions), a greater wicking effect may be achieved than if the wick is passed out of the passage near the top of the head and down along the outside of the head towards the tip (as in the 350 ml version). This extra wicking effect is desirable to offset the reduced wicking caused by an increased height over which the wick has to travel in the 700 ml and 1000 ml reservoirs, as well as because the 700 ml and 1000 ml versions are intended for use with larger pot plants which usually require more water.

Applicant has also found that increasing the width of the wick can result in greater wicking effect. For example, an 8 mm strip wick may wick to approximately 20% higher than a 4 mm strip wick. Thus, in the preferred embodiments an 8 mm wide wick is used in the 700 ml and 1000 ml versions, whereas a 6 mm wick is used in the 350 ml version.

Whilst the above description includes the preferred embodiments of the invention, it is to be understood that many variations, alterations, modifications and/or additions may be introduced into the constructions and arrangements of parts previously described without departing from the essential features or the spirit or ambit of the invention.

It will be also understood that where the word "comprise", and variations such as "comprises" and "comprising", are used in this specification, unless the context requires otherwise such use is intended to imply the inclusion of a stated feature or features but is not to be taken as excluding the presence of other feature or features.

The reference to any prior art in this specification is not, and should not be taken as, an acknowledgment or any form of suggestion that such prior art forms part of the common general knowledge in Australia.

The invention claimed is:

1. A watering device comprising, a receptacle comprising a reservoir, a wick adapted to extend from the reservoir into a plant growing medium, and a probe, which projects from the reservoir and is adapted to penetrate or extend into the plant growing medium, the probe comprising a stem projecting from the reservoir, a head located at a free end of the probe and adjoining the stem, the head adapted to be put or buried in the plant growing medium with the wick passing along an outer surface of the head, and a passage within the probe for the wick to pass through, the passage extending between the reservoir and the head wherein the wick is a sponge material comprising woven or non-woven fibers and is adapted to extend from the reservoir within or along the probe and into the plant growing medium.

2. The watering device according to claim 1 wherein the fibers comprise Polyvinyl Alcohol.

3. The watering device according to claim 1 wherein the fibers are non woven.

4. The watering device according to claim 3 wherein the fibers are bound by a resin.

5. The watering device according to claim 4 wherein the resin comprises a Polyvinyl Alcohol foam resin.

6. The watering device according to claim 1 wherein, the probe comprises an upper opening at or near the top of the head, and the wick passes from the reservoir through the passage within the probe, out of the probe through the upper opening, and down along the outside of the head.

7. The watering device according to claim 6 wherein, the passage extends within the head, the probe comprises a lower opening at or near the bottom of the head, and the wick passes from the reservoir through the passage within the probe, out of the probe through the lower opening, and back up along the outside of the head.

8. The watering device according to claim 7 wherein the head has a cone like shape whose sides converge towards the bottom of the head.

9. The watering device according to claim 8 wherein the wick splits into two strips within the probe, the two strips then passing outside the probe and extending straight up or down along opposite sides of the outer surface of the head.

10. The watering device according to claim 9 wherein the head defines one or more grooves or channels along its outer surface for passage of the wick.

11. The watering device according to claim 10 wherein the probe comprises a dam with a slot for locating the wick.

12. The watering device according to claim 1 wherein a water capacity of the reservoir is greater than ten per cent of a volume of the plant growing medium in a pot being watered.

13. The watering device according to claim 1 comprising a support for supporting the device on a rim of a plant pot.

14. The watering device according to claim 13 wherein, the support comprises a hook member which projects from the receptacle and is adapted to hook over the rim of the plant pot, and the probe doubles as the hook member.

15. The watering device according to claim 14 wherein, the receptacle comprises a fill port for filling the reservoir with liquid, and the fill port is covered by mesh.

16. The watering device according to claim 15 wherein the plant growing medium comprises soil.

* * * * *